3,345,356
PROCESS FOR PREPARING AROMATIC AZO COMPOUNDS

James E. Kmiecik, Lake Charles, La., assignor, by mesne assignments, to Columbian Carbon Company, a corporation of Delaware
No Drawing. Filed Nov. 29, 1963, Ser. No. 327,054
13 Claims. (Cl. 260—194)

This invention relates to a method for the preparation of azoaryls. More particularly this invention relates to the preparation of azoaryls by the reductive coupling of a nitroaryl in the presence of a metal carbonyl catalyst and carbon monoxide.

Prior art methods for producing azoaryl compounds in general are based on reduction of a nitroaryl with hydrogen and a metal such as iron or zinc in the presence of water. Other procedures are based on the oxidative coupling of aniline, substituted anilines and other primary amino substituted aryls. However, both of these methods suffer from various shortcomings which are well known in the art.

It has now been found that azoaryls can be prepared by the reductive coupling of a nitroaryl in the presence of a metal carbonyl and carbon monoxide as a reducing agent. In the reaction, two nitro groups from different molecules are reduced to produce the azo linkage of the azoaryl whereas the carbon monoxide is oxidized to carbon dioxide.

The general reaction involved in the method of this invention can be illustrated by the following generic equation:

$$Ar-NO_2 + Ar_1-NO_2 + 4CO \xrightarrow[\text{Solvent}]{M_x(CO)_y} Ar-N=N-Ar_1 + 4CO_2$$

wherein each of Ar and $Ar_1$ are aryls, M is a metal and $x$ and $y$ are whole numbers. The nitroaryls employed in the reaction can be the same or different, thus producing symmetrical or unsymmetrical azo compounds. Preferably, in the reaction of this invention, a single nitroaryl is coupled to produce a symmetrical azoaryl. The nitroaryl reactants can be unsubstituted or substituted with various groups which do not interfere with the production of the azo compounds and which are not destroyed by the reaction conditions employed. The aryl reactants can be carbocyclic or heterocyclic. The carbocyclic aryls, particularly those of benzene, naphthalene and their substituted derivatives are preferred. Illustrative of the carbocyclic aryl reactants there can be mentioned those of benzene, naphthalene, perylene, anthracene, phenanthrene, and the like aryls having one nitro group per molecule.

Illustrative of the substituent groups on the aromatic nucleus in the nitroaryl reactants which do not interfere with the reaction there can be mentioned various groups, particularly organic radicals such as: lower alkyls, e.g., methyl, ethyl, propyl, isopropyl, butyl and hexyl; lower alkoxy radicals, e.g., methoxy, ethoxy, propoxy, butoxy, pentoxy, and the like; halogens, e.g., florine, chlorine, bromine and iodine; amino radicals such as primary amine, secondary or tertiary amines, e.g., lower alkylamines such as N-methyl, N-methyl-N-ethyl, etc.; esters (alkoxycarbonyl) such as those which can be represented by the formula $$-\overset{O}{\underset{\|}{C}}-O-R$$

where R is a hydrocarbon radical such as aryl, e.g., benzene or toluene or an alkyl, such as methyl, ethyl, propyl, butyl and so forth; keto groups such as those of the formula $$-\overset{O}{\underset{\|}{C}}-R$$

when R is a hydrocarbon radical having from 1 to about 7 carbon atoms which may be either alkyl or aryl, for example, methyl, ethyl, propyl, butyl, benzyl, etc. The nitroaryl reactant can contain from 1 to 5 or more substitutents such as those described hereinbefore which can be on any of the unoccupied positions on the aryl nucleus. The term "lower" as employed herein to modify an alkyl group and alkyl containing group refers to such groups containing from 1 to 6 carbon atoms.

Generally, the reaction is conducted in an inert organic solvent in which the nitroaryl is dissolved. Suitable solvents include various classes of compounds including hydrocarbons, halogenated hydrocarbons, alcohols, ethers, amines and other inert solvents. By the expression "inert" is meant that the solvent is inert to the reactants and products under the conditions used, and is miscible with the nitroaryl reactant or reactants. Suitable solvents include benzene, toluene, p-xylene, o-xylene, m-xylene, hexane, cyclohexane, ethylcyclohexane, petroleum ether, chlorobenzene, carbon tetrachloride, chloroform, acetone, ethylene diamine, ethanol, propanol, butanol, ethylene glycol, glycerol, furyl alcohol, dioxane, and other organic solvents. Mixtures of solvents may be used.

A suitable generic formula for the metal carbonyl cataylst is $M_x(CO)_y$ whereon M is a metal and $x$ and $y$ are whole numbers. The metal can be a transition metal and particularly a carbonyl forming metal from Group VIII of the Periodic System. The letters $x$ and $y$ of the generic formula for the catalyst represent the coordination number for the metal carbonyl. Preferably the catalyst is soluble in the solvent or the reaction medium. However, it can be maintained in suspension if it is substantially insoluble or only slightly soluble. A suitable particle size for catalyst which is not soluble, in the solvent or reaction medium is between 100 and 300 mesh, U.S. Sieve Series, although particles as large as 20 mesh as useful. Illustrative of the metals of the metal carbonyl catalyst there can be mentioned those of iron, molybdenum, ruthenium, manganese, osmium, rhodium, cobalt, nickel, iridium, tungsten, titanium, and the like. Illustrative of specific metal carbonyl catalysts of this invention there can be mentioned those of the formula: $Cr(CO)_6$; $Mo(CO)_6$; $W(CO)_6$; $Mn_2(CO)_{10}$; $Re_2(CO)_{10}$; $Fe(CO)_5$; $Fe_2(CO)_9$; $Fe_3(CO)_{12}$; $Ru(CO)_5$; $Ru_2(CO)_9$; $Ru_3(CO)_{12}$; $Os(CO)_5$; $Os_2(CO)_9$; $Co(CO)_8$; $Co_4(CO)_{12}$; $Rh_2(CO)_8$; $Rh_4(CO)_{12}$; $Ir_2(CO)_8$; $Ir_4(CO)_{12}$; and $Ni(CO)_4$. The preferred catalyst is iron pentacarbonyl.

A preferred embodiment of this invention can be represented by the following generic equation:

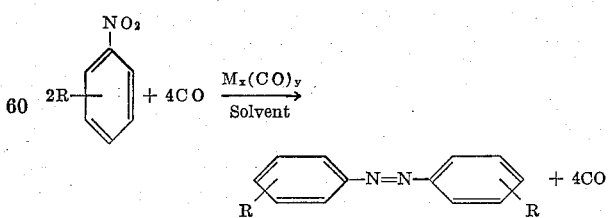

wherein R can be hydrogen or a group which is non-reactive to the reactants and reaction conditions. Illustrative of such a substitutent group ther can be mentioned halogen, lower alkyl, lower alkoxy, primary amino, lower alkoxycarbonyl, cyano, and lower alkylcarbonyl; M of the above preferred generic formula is a transition metal;

and $x$ and $y$ are whole members. However, the nitrobenzene reactant can contain more than one substituent "R" group such as two or three such groups which can be on any of the unoccupied positions of the benzene nucleus.

Illustrative of the nitroaryl reactants which can be employed in the process of this invention there can be mentioned: o-nitroacetanilide; p-nitroacetophenone; p-chloronitrobenzene; p-nitrotoluene; p-nitro-N,N-dimethylaniline; nitro-2-aminoanisole; p-nitroaniline; m-nitroaniline; nitroanthracene (nitrosoanthron); pentachloronitrobenzene; beta-nitronaphthalene; m-nitrophenetol; m-nitrotoluene; and 1-nitro-2,4-dimethylbenzene. Illustrative of azo compounds produced by the process of this invention there can be mentioned; azobenzene; 4,4'-dibromoazobenzene; azoanthracene; 2,2'-azobis(4-bromoanisole); p-azodiphenyl; 4-4-dimethylazonbenzene; m-azotoluene; 2-aminaazobenzene; 2,2'-azodianiline; 4-N,N-dimethylaminoazobenzene; 4,4'-diphenylazobenzene; 4,4'-dichloroazobenzene; 1,1'-azonaphthalene, 1,2'-azonaphthalene; 2,2' - dimethylazobenzene; 4,4' - diacetylazobenzene; and the like.

The reaction conditions for the process of this invention can vary over a wide range. Thus temperature can preferably vary from about 100° C. to about 500° C. and particularly from about 190° C. or 200° C. to about 300° C. The carbon monoxide pressure can preferably vary from about 1,000 to 10,000 p.s.i.g. and particularly from about 1,800 p.s.i.g. to about 4,000 p.s.i.g. The reaction time can vary from less than 1 to over 10 hours and preferably from about 1.5 to about 5 hours. The catalytically effective quantity of metal carbonyl is not critical and can vary from about less than 1 mole of catalyst for each 50 moles of the nitroaryl to equal molar quantities of catalyst and nitroaryl and particularly in a molar ratio of from about 1/20 to about 1/5 of catalyst to nitroaryl. The organic solvent should be sufficient to dissolve an appreciable portion of the nitroaryl. Illustratively the quantity of solvent can vary over a molar ratio of 1/1 to 50/1 and particularly from about 15/2 to 5/2 moles of solvent per mole of nitroaryl reactant.

The compounds prepared by the method of this invention are useful as dyes, insecticides and fungicides. Many of the compounds prepared by the method of this invention are well known. When used as dyes they can be employed in the manner of other azo dyes. When used as insecticides they can be admixed with an pulverulant insecticidal carrier such as calcium carbonate to prepare an insecticidal composition containing from about 5 to 10% of the azo compound.

As shown by the generic equations hereinbefore, 4 moles of carbon monoxide react with two moles of the nitroaryl to produce the azoaryl. The quantity of carbon monoxide contacted with the nitroaryl can be the stoichiometric quantity shown by the generic equations or it can be in lesser or greater amounts such as from about 0.1 to 10 moles of CO per mole of nitroaryl although preferably from about 0.5 to 5 moles of CO per mole of nitroaryl can be employed. Contact of the nitroaryl and CO can be effected by various means such as by contacting a solution of nitroaryl in an inert organic solvent at ambient temperature and atmospheric pressure with CO, pressurizing to the desired values and subsequently rocking or in some other fashion agitating the solution. Additionally other means for contact can be employed such as by passing CO through a solution of a nitroaryl in an inert organic solvent. Carbon monoxide gas supplied to the reaction mixture can be substantially pure CO or it can contain appreciable quantities, e.g. less than about 10% by weight, of inert diluents such as nitrogen, carbon dioxide, etc. Preferably the carbon monoxide employed is substantially pure except as diluted by vapors of the liquid reaction mixture.

The following examples are illustrative of the invention.

EXAMPLE 1

*Conversion of nitrobenzene to azobenzene*

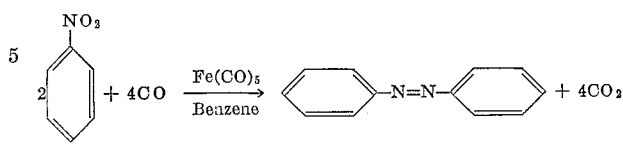

A glass-lined, 1400 ml. rocking autoclave was charged with a solution of 6.15 g. (0.05 mole) of nitrobenzene and 1.0 g. (0.005 mole) of iron pentacarbonyl in 100 ml. of dry benzene. The system was sealed, flushed with nitrogen and pressurized to 2000 p.s.i.g. with CO. The mixture was heated to 204° C. over a period of 1.5 hours and rocked at 204–210° C. (CO pressure was 2975–3000 p.s.i.g.) for 1.3 hours. After allowing the reactor to cool to room temperature (approx. three hours) the excess gases were vented, the reaction mixture removed from the autoclave and filtered to remove a small amount of black solid. The filtrate, after treatment with charcoal, was dark orange in color. Evaporation of the solvent gave a orange-black crystalline (needles) solid. Recrystallization from 50% aqueous ethanol gave 3.6 g. (79 mole percent yield based on nitrobenzene) of azobenzene, M.P. 67–69° C.

EXAMPLE 2

*Conversion of p-bromonitrobenzene to 4,4'-dibromoazobenzene*

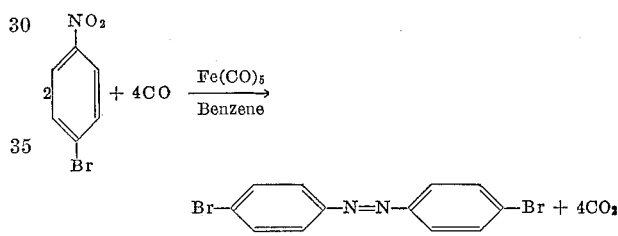

The autoclave described in Example 1 was charged with a solution of 40.4 g. (0.20 mole) of p-bromonitrobenzene and 3.92 g. (0.02 mole) or iron pentacarbonyl in 200 ml. of dry benzene. Following the procedure given in Example 1, the autoclave was pressured to 2000 p.s.i.g. with CO and rocked at 204–207° C. (CO pressure was 3100–3175 p.s.i.g.) for 1.3 hours. After working up the mixture as described in Example 1, there was obtained 19.1 g. (56.1 mole percent yield based on p-bromonitrobenzene) of 4,4'-dibromoazobenzene, M.P. 202–203°.

EXAMPLE 3

Conversion of p-nitroacetophenone to 4,4'-diacetylazobenzene

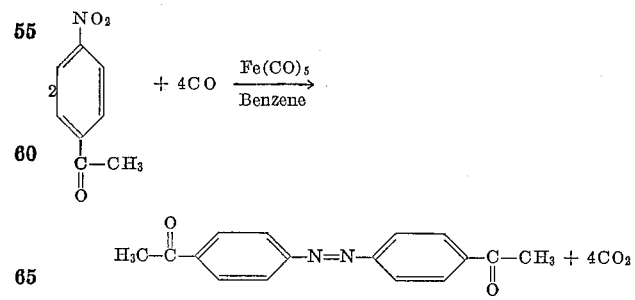

The autoclave described in Example 1 was charged with a solution of 16.5 g. (0.10 mole) of p-nitroacetophenone and 2.0 g. (0.01 mole) of iron pentacarbonyl in 150 ml. of dry benzene. Following the procedure given in Example 1, the autoclave was pressured to 2000 p.s.i.g. with CO and rocked for 1.3 hours. After working up the mixture as described in Example 1, there was obtained 5.3 gms. (39.8 mole percent yield based on p-nitroacetophenone) of 4,4'-diacetylazobenzene, M.P. 105–110° C.

EXAMPLE 4

Following the procedure of Example 1 symmetrical azo compounds can be produced by substituting the same molar quantities of the following nitroaryls for the nitrobenzene of Example 1:

pentachloronitrobenzene;
alpha-nitronaphthalene;
m-nitroaniline;
1-nitro-2,4-dimethylbenzene;
2-nitro-6-chlorotoluene; and
1-nitro-3-methyl-5-ethylbenzene Also, in place of the iron pentacarbonyl of Example 1 other metal carbonyl catalyst such as nickel carbonyl can be employed with the reactants of this example.

EXAMPLE 5

Following the procedure of Example 1 the corresponding unsymmetrical azoaryls of the formula $$Ar—N=N—Ar_1$$

wherein Ar and $Ar_1$ are different aryl radicals can be produced simultaneously with the individual symmetrical azoaryls by substituting equimolecular quantities of the following mixtures of nitroaryls for the total quantity of nitrobenzene employed in Example 1:

p-chloronitrobenzene with nitro-2-aminoanisole;
p-nitroaniline with m-nitroaniline;
nitrobenzene with p-nitrotoluene; and
1-nitro-2,4-dimethylbenzene with m-nitroaniline.

What is claimed is:

1. A method for preparing an aromatic azo compound which comprises contacting at a temperature of from about 100° C. to 1,000° C. a nitroaromatic compound of the formula $$Ar—NO_2$$

dissolved in an inert organic solvent and wherein Ar is an aryl group with carbon monoxide at a pressure of about 1,000 to 10,000 p.s.i.g. in the presence of a metal carbonyl of the formula $M_x(CO)_y$ wherein $x$ and $y$ are whole numbers and M is a Group VIII transition metal.

2. The method of claim 1 wherein the temperature is from about 190° C. to 250° C., pressure is from about 1800 p.s.i.g. to 4,000 p.s.i.g. and wherein the transition metal is iron.

3. Process for preparing an aromatic azo compound which comprises contacting a nitro aryl compound having from 0 to 5 ring substituents selected from alkyl, alkoxy, halogen, primary amino, lower alkylamino and lower alkylcarbonylamino groups and hydrocarbyloxycarbonyl and hydrocarbylcarbonyl groups having from two to about eight carbon atoms with carbon monoxide at a temperature of from about 100° C. to about 500° C. under a pressure of from about 1000 p.s.i.g. to about 10,000 p.s.i.g. in the presence of a catalytic quantity of a transition metal carbonyl.

4. The process of claim 3 wherein said contact is effected in the presence of an inert organic solvent for said nitro aryl compound.

5. The process of claim 3 wherein said metal carbonyl is a Group VIII metal carbonyl and the molar ratio of metal carbonyl to nitro aryl compound is from about 1:50 to about 1:1.

6. A method for preparing an aromatic azo compound which comprises contacting a solution of mononitrobenzene dissolved in an inert organic solvent with carbon monoxide at a pressure of from about 1,000 to 10,000 p.s.i.g. and at a temperature of from about 100° C. to about 500° C. in the presence of a metal carbonyl of the formula $M_x(CO)_y$ wherein M is a Group VIII metal and $x$ and $y$ are whole numbers.

7. The method of claim 3 wherein said nitro aryl compound is a nitrobenzene formula

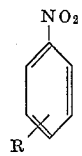

wherein R is a member selected from the group consisting of hydrogen, lower alkyl, lower alkoxy, halogen, primary amino, lower alkoxycarbonyl, and lower alkylcarbonyl.

8. The method of claim 7 wherein R is halogen.

9. The method of claim 7 wherein R is lower alkylcarbonyl.

10. The method of claim 7 wherein R is primary amino.

11. The method of claim 7 wherein the carbon monoxide pressure is from about 1800 p.s.i.g. to 4,000 p.s.i.g., the temperature is from about 190° C. to 250° C., the metal carbonyl is an iron carbonyl which is dissolved in an inert organic solvent and the nitro aryl compound is p-R-nitrobenzene.

12. The process of claim 11 wherein said nitro aryl compound is selected from the group consisting of nitrobenzene, p-bromonitrobenzene and p-nitroacetophenone.

13. Process for preparing azobenzene which comprises contacting a benzene solution of nitrobenzene with carbon monoxide at a pressure of from about 1800 p.s.i.g. to about 4000 p.s.i.g. and at a temperature of from about 190° C. to about 300° C. in the presence of from about 0.02 mole to about 1 mole of iron pentacarbonyl per mole of said nitrobenzene.

References Cited

Buckley et al., Journ. Chem. Soc. (London), vol. of 1949, pp. 1154–1156, QD1.C6.

CHARLES B. PARKER, *Primary Examiner.*

F. D. HIGEL, *Assistant Examiner.*